(12) United States Patent
Fukushima et al.

(10) Patent No.: US 11,361,882 B2
(45) Date of Patent: Jun. 14, 2022

(54) WIRING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Daichi Fukushima, Mie (JP); Hiroki Hirai, Mie (JP); Makoto Higashikozono, Mie (JP); Housei Mizuno, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/261,913

(22) PCT Filed: Jul. 10, 2019

(86) PCT No.: PCT/JP2019/027250
§ 371 (c)(1),
(2) Date: Jan. 21, 2021

(87) PCT Pub. No.: WO2020/026728
PCT Pub. Date: Feb. 6, 2020

(65) Prior Publication Data
US 2021/0313091 A1 Oct. 7, 2021

(30) Foreign Application Priority Data

Jul. 31, 2018 (JP) .............................. JP2018-143788

(51) Int. Cl.
*H01B 7/08* (2006.01)
*H02G 3/30* (2006.01)

(52) U.S. Cl.
CPC .................. *H01B 7/0846* (2013.01)

(58) Field of Classification Search
CPC ... B60R 16/0215; B60R 16/0207; H01B 7/08; H01B 7/0846; H02G 3/30
See application file for complete search history.

(56) References Cited

U.S. PATENT DOCUMENTS

| 10,734,134 B2 | 8/2020 | Mizuno et al. |
| 2008/0049410 A1 | 2/2008 | Kawaguchi et al. |

(Continued)

FOREIGN PATENT DOCUMENTS

| CN | 101506969 | 8/2009 |
| CN | 107275902 | 10/2017 |

(Continued)

OTHER PUBLICATIONS

Japan Office Action issued in Japan Patent Application No. 2018-143788, dated Jul. 6, 2021, together with an English translation thereof.

(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring member includes a sheet material in which a weight reduction space is formed and a wire-like transmission member fixed on the sheet material. For example, the weight reduction space includes a bottomed hole. For example, the sheet material includes a first base material in which a base material side through hole passing through the first base material in a thickness direction is formed and a (Continued)

second base material overlapped with the first base material to cover the base material side through hole, and the base material side through hole which is partially covered by the second base material forms the bottomed hole.

9 Claims, 8 Drawing Sheets

(56) References Cited

U.S. PATENT DOCUMENTS

| | | |
|---|---|---|
| 2009/0309116 A1 | 12/2009 | Kato et al. |
| 2016/0268019 A1 | 9/2016 | Kanagawa |
| 2020/0328008 A1 | 10/2020 | Mizuno et al. |

FOREIGN PATENT DOCUMENTS

| | | | |
|---|---|---|---|
| JP | 6-28922 | | 2/1994 |
| JP | H0628922 A | * | 2/1994 |
| JP | 7-115720 | | 5/1995 |
| JP | 2012-157093 | | 8/2012 |
| JP | 2012157093 A | * | 8/2012 |
| JP | 2015-103457 | | 6/2015 |
| JP | 2015-122923 | | 7/2015 |
| JP | 2016-134982 | | 7/2016 |
| JP | 2018-85321 | | 5/2018 |
| TW | 200814896 | | 3/2008 |
| WO | 2010/105268 | | 9/2010 |

OTHER PUBLICATIONS

Official Communication issued in International Patent Application No. PCT/JP2019/027250, dated Sep. 10, 2019, along with an English-language translation thereof.

Official Communication issued in International Patent Application No. PCT/JP2019/027250, dated Feb. 4, 2021, along with an English translation thereof.

China Office Action issued in China Patent Application No. 201980050572.1, dated Jan. 19, 2022, together with English translation thereof.

* cited by examiner

WIRING MEMBER

TECHNICAL FIELD

The present invention relates to a wiring member mounted to a vehicle.

BACKGROUND ART

Patent Document 1 discloses a technique of sewing an electrical wire to a sheet material to form a flat wire harness as a wiring member.

PRIOR ART DOCUMENTS

Patent Documents

Patent Document 1: Japanese Patent Application Laid-Open No. 2018-85321

SUMMARY

Problem to be Solved by the Invention

However, when the flat wiring member is formed using the sheet material as with the technique described in Patent Document 1, a weight of the wiring member increases by the sheet material.

An object is therefore to provide a technique capable of reducing a weight of a wiring member kept flat by a sheet material.

Means to Solve the Problem

A wiring member according to the present disclosure is a wiring member including a sheet material in which a weight reduction space is formed and a wire-like transmission member fixed on the sheet material.

Effects of the Invention

According to the present disclosure, the weight of the wiring member kept flat by the sheet material can be reduced.

DESCRIPTION OF EMBODIMENT(S)

Description of Embodiment of Present Disclosure

Figure 1:
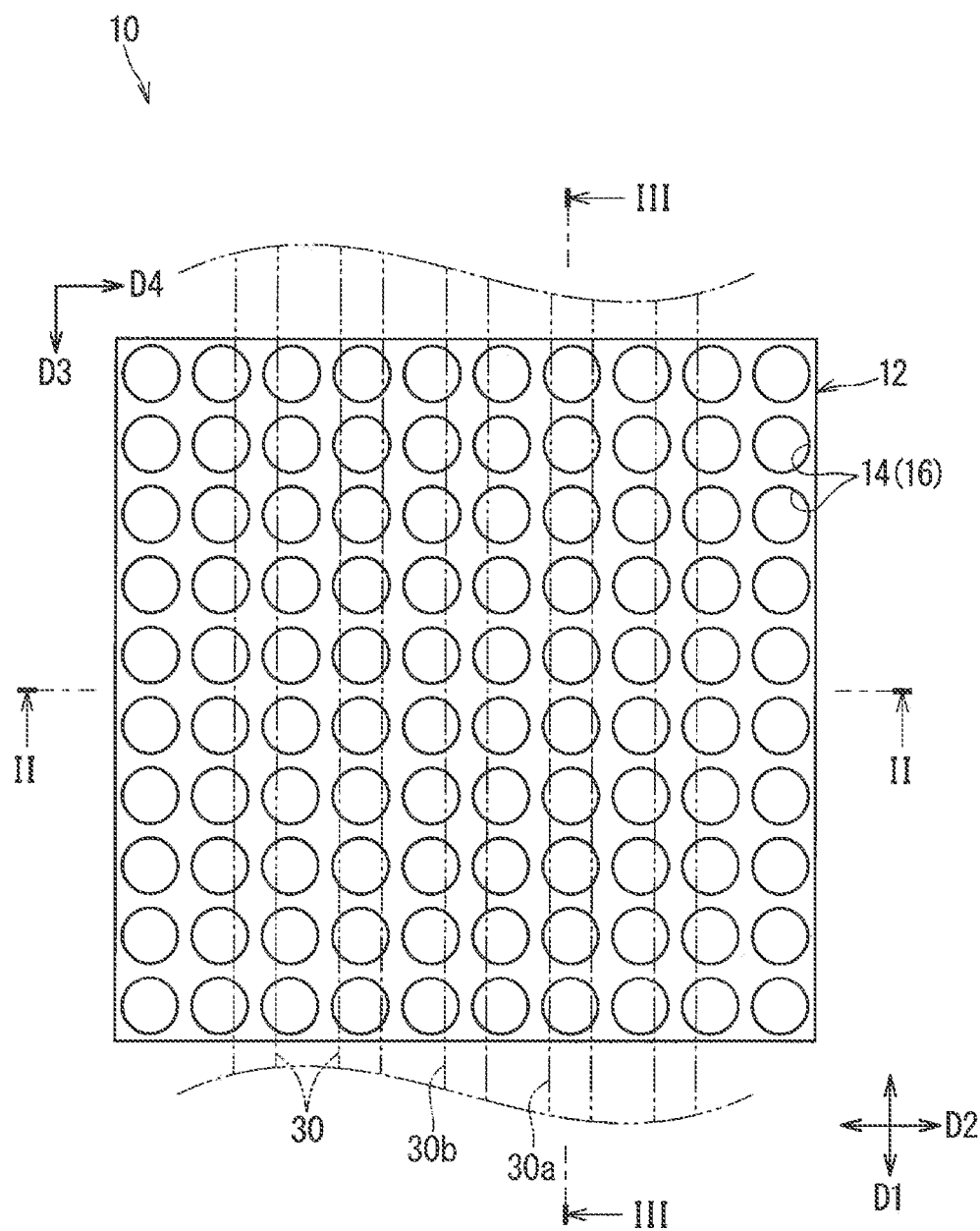
FIG. 1 A plan view illustrating a wiring member according to a first embodiment.

Embodiments of the present disclosure are listed and described firstly.

A wiring member according to the present disclosure is as follows.

(1) A wiring member according to the present disclosure is a wiring member including a sheet material in which a weight reduction space is formed and a wire-like transmission member fixed on the sheet material. Accordingly, the weight of the sheet material can educed by the weight reduction space formed in the sheet material, and the weight of the wiring member kept flat by the sheet material can be reduced.

(2) The weight reduction space may include a bottomed hole. Accordingly, reduction in a protection capacity can be suppressed compared with a portion where the weight reduction space is a through hole.

(3) It is also applicable that the sheet material includes a first base material in which a base material side through hole passing through the first base material in a thickness direction is formed and a second base material overlapped with the first base material to cover the base material side through hole, and the base material side through hole which is partially covered by the second base material forms the bottomed hole. Accordingly, the sheet material provided with the bottomed hole can be formed by overlapping the first base material in which the base material side through hole is formed in advance with the second base material covering the first base material.

(4) In the first base material and the second base material, a weight per unit area of the first base material may be larger than that of the second base material. Accordingly, the weight can be significantly reduced compared with a case where the base material side through hole is formed in a base material having a small weight per unit area.

(5) The weight reduction space may include a sheet material side through hole passing through the sheet material in a thickness direction. Accordingly, the weight can be significantly reduced compared with a case where the weight reduction space is the bottomed hole.

(6) The wire-like transmission member and the sheet material may be fixed by a contact area direct fixation. Accordingly, the wire-like transmission member can be fixed on the sheet material by welding, for example.

(7) The wire-like transmission member may be fixed on a main surface of the sheet material on a side with an opening of the weight reduction space by a contact area direct fixation, and a portion where the wire-like transmission member is fixed in a main surface of the sheet material where the wire-like transmission member is fixed may be concaved more than a portion around the portion where the wire-like transmission member is fixed. Accordingly, in the main surface of the sheet material on the side with the opening of the weight reduction space, the sheet material is concaved easily at the time of the contact area direct fixation. The main surface of the sheet material on the side with the opening of the weight reduction space is concaved, thus the thickness of the wiring member can be reduced.

(8) The wire-like transmission member may be disposed to extend across the opening of the weight reduction space, and a peripheral edge of the opening of the weight reduction space may be fixed to the wire-like transmission member by a contact area direct fixation. Accordingly, a contact area with the wire-like transmission member is reduced in the peripheral edge of the opening of the weight reduction space, thus energy is easily concentrated on a contact part at the welding.

(9) It is applicable that the wire-like transmission member includes a transmission wire body and a covering for covering the transmission wire body, both the covering and the sheet material are formed by a material containing polyvinyl chloride and fixed by a contact area direct fixation, and the weight reduction space is formed in a portion of the sheet material formed by a material containing polyvinyl chloride. Accordingly, the weight of the wiring member can be reduced while fixing the covering and the sheet material formed by the material both containing polyvinyl chloride by the contact area direct fixation.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

First Embodiment

Figure 2:
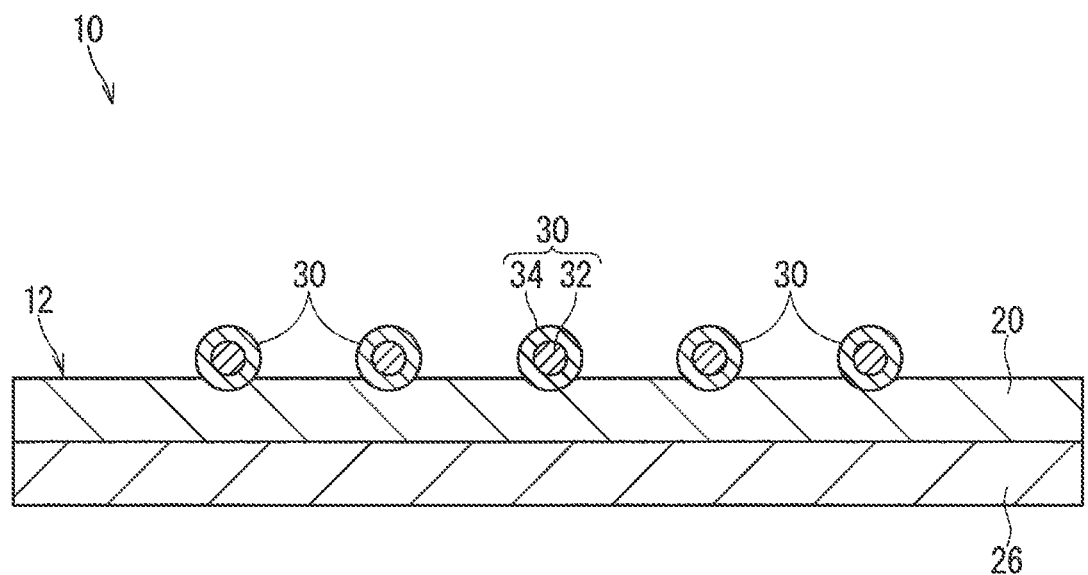
FIG. 2 A cross-sectional view of e wiring member cut along a II-II line in FIG. 1.
Figure 3:
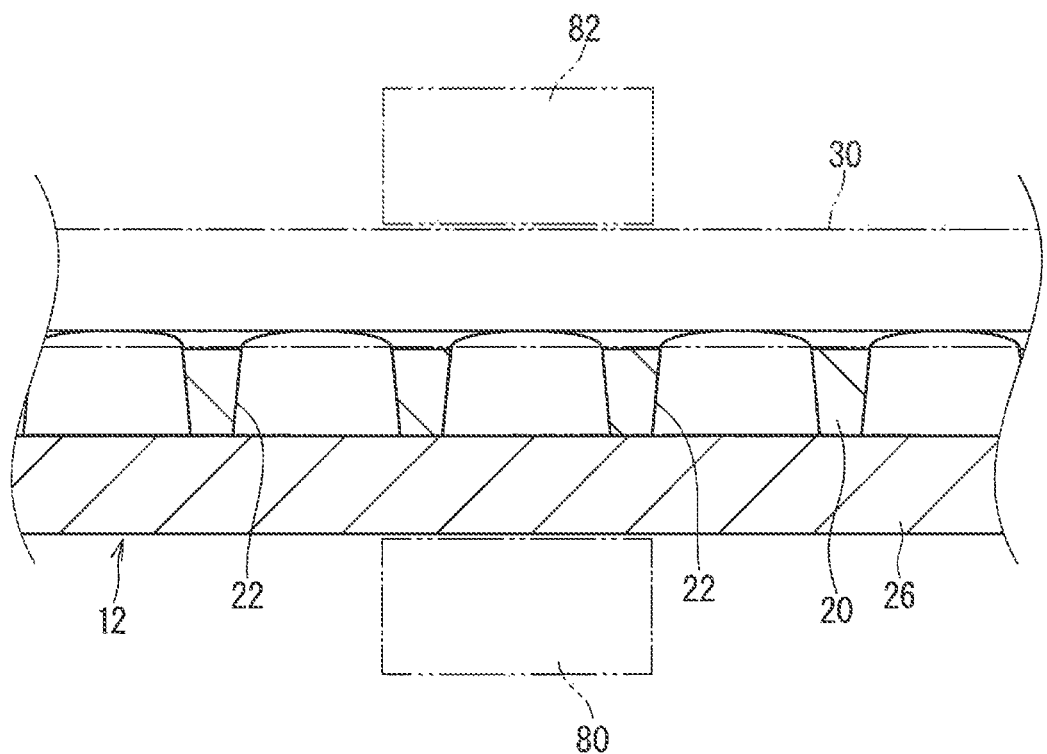
FIG. 3 A partially-enlarged cross-sectional view of the wiring member cut along a III-III line in FIG. 1.

A wiring member according to a first embodiment is described hereinafter. FIG. 1 is a plan view illustrating a wiring member 10 according to the first embodiment. FIG. 2 is a cross-sectional view of the wiring member cut along a II-II line in FIG. 1. FIG. 3 is a partially-enlarged cross-sectional view of the wire harness cut along a III-III line in FIG. 1. In FIG. 1 and FIG. 3, a wire-like transmission member 30 is illustrated by a visual line for easy understanding.

The wiring member 10 is a member joined to a component mounted to a vehicle to transmit electrical power and/or light to and/or from the component. The wiring member 10 includes a sheet material 12 and the wire-like transmission member 30 fixed on the sheet material 12. The wiring member 10 is flatly formed.

The sheet material 12 is a member keeping the wire-like transmission member 30 flat. In the sheet material 12, a weight reduction space 14 is formed in a base material.

Herein, the weight reduction space 14 is formed to reduce a weight of the sheet material 12. That is to say, when a structure except for a presence or absence of the weight reduction space 14 is the same in a portion of the sheet material 12 including the weight reduction space 14 and a portion thereof not including the weight reduction space 14, a weight per unit area of the portion including the weight reduction space 14 is smaller than that of the portion not including the weight reduction space 14. Accordingly, the weight reduction space 14 does not include a concave portion formed by simply compressing a part of a flat base material. The unit area herein indicates a unit area when the base material is seen in a plan view (when the base material is seen in a normal direction of a main surface).

The weight reduction space 14 is purposely formed in a predetermined position in the base material. Accordingly, the weight reduction space 14 does not include a gap of an air bubble part in a foam-molded foam and a gap between fibers in a non-woven cloth, for example.

A material constituting the base material is not particularly limited, but may contain resin such as polyvinyl chloride (PVC), polyethylene (PE), polyethylene terephthalate (PET), and polypropylene (PP), for example, or may contain metal such as aluminum or copper. A structure of the base material is not particularly however, a fiber material having fibers such as a contexture, a knitting, and a non-woven cloth, for example, may be applicable, and a non-fiber material which does not have fibers such as a member made up by extrusion molding or injection molding. When the base material is a non-woven fiber material made up by extrusion molding or injection molding, a foam made up by foam molding or a solid material which is not foam-molded but is uniformly solid may also be applicable. When the base material is a foam or a non-woven cloth, the weight reduction space 14 is formed separately from a gap by air bubbles and a gap between fibers.

The sheet material 12 may have a single layer or a plurality of layers. That is to say, the sheet material 12 is formed of a single base material or a plurality of base materials overlapped with each other. When the sheet material 12 has a plurality of layers, a material and a structure in each layer can be appropriately combined. For example, the sheet material 12 may be made up of a resin layer and a resin layer overlapped with each other, a resin layer and a metal layer overlapped with each other, or a metal layer or a metal layer overlapped with each other. The sheet material 12 may be made up of a non-fiber material layer and a non-fiber material layer overlapped with each other, a non-fiber material layer and a fiber material layer overlapped with each other, or a fiber material layer and a fiber material layer overlapped with each other.

Herein, the weight reduction space 14 is a bottomed hole 16 and does not pass through the sheet material 12. The bottomed hole 16 has only one bottom. Thus, the bottomed hole 16 is opened on a side of one main surface of the sheet material 12. However, there may also be a case where the bottomed hole has two bottoms. In this case, the bottomed hole does not appear in the main surface of the sheet material 12, but constitutes a hollow space inside the sheet material 12.

The sheet material 12 includes a first base material 20 and a second base material 26. The first base material 20 and the second base material 26 are overlapped with each other in a thickness direction. A base material side through hole 22 passing through the first base material 20 in the thickness direction is formed. The second base material 26 is overlapped with the first base material 20 to cover the base material side through hole 22. Accordingly, the base material side through hole 22 constitutes a hole part (a space part and a peripheral wall part thereof) of the bottomed hole 16, and the second base material 26 covering the base material side through hole 22 constitutes the bottom of the bottomed hole 16. The first base material 20 appears in one main surface of the sheet material 12. Accordingly, one opening of the base material side through hole 22 appears in one main surface of the sheet material 12, and constitutes the opening of the bottomed hole 16.

Only one weight reduction space 14 may be formed, or the plurality of weight reduction spaces 14 may also be formed. In the example illustrated in FIG. 1, the plurality of weight reduction spaces 14 are formed.

The plurality of weight reduction spaces 14 may be arranged in random order, or may also be arranged in positions with periodicity. In the former case, when the base material is cut out from a parent material, the plurality of weight reduction spaces 14 may be arranged in random order in the parent material, for example, or it is also considered that the plurality of weight reduction spaces 14 are arranged in positions with periodicity in the parent material and the base material is cut out in the same cycle as the plurality of weight reduction spaces 14 in the parent material or at an interval smaller than the cycle of the weight reduction space 14, thus the plurality of weight reduction spaces 14 are arranged in random order. In the latter case, one group made up of the plurality of weight reduction spaces 14 arranged in random order may be arranged at regular intervals in at least one direction, or one weight reduction space 14 may be arranged at regular intervals in at least one direction.

Herein, the plurality of weight reduction spaces 14 are arranged in positions with periodicity. Particularly herein, the weight reduction spaces 14 are arranged in two directions mutually intersecting at regular intervals, thus the plurality of weight reduction spaces 14 are arranged in positions with periodicity in the sheet material 12.

More specifically, in the example illustrated in FIG. 1, the plurality of bottomed holes 16 as the weight reduction spaces 14 are arranged at regular intervals along a first direction D1 and a second direction D2. The first direction D1 and the second direction D2 are directions mutually perpendicular. The first direction D1 and the second direction D2 are directions parallel to a vertical direction D3 and a lateral direction D4 of a quadrangular sheet material 12, respectively. Accordingly, the plurality of bottomed hole 16 are disposed in a lattice point form in the sheet material 12.

At this time, in the example illustrated in FIG. 1, intervals of the bottomed holes 16 arranged in the first direction D1 and intervals of the bottomed holes 16 arranged in the second direction. D2 are the same as each other. Herein, the first direction D1 and the second direction D2 are the directions parallel to the vertical direction D3 and the lateral direction D4 of the quadrangular sheet material 12, respectively, thus it can also be considered that the intervals of the bottomed holes 16 arranged in the vertical direction D3 of the quadrangular sheet material 12 and the intervals of the bottomed holes 16 arranged in the lateral direction D4 are the same as each other. However, the intervals of the bottomed holes 16 arranged in the first direction D1 and the intervals of the bottomed holes 16 arranged in the second direction D2 may be different from each other. The intervals of the bottomed holes 16 arranged in the vertical direction D3 of the quadrangular sheet material 12 and the intervals of the bottomed holes 16 arranged in the lateral direction D4 may be different from each other.

The weight reduction space 14 may be molded into a shape having the weight reduction space 14 in advance at the time of molding the base material and then supplied, or may also be supplied by an additional process after molding the base material. In the former case, for example, the weight reduction space 14 is considered to be formed by a process that a mold having concave and convex is filled with a fluid material so that the material does not reach a portion constituting the weight reduction space 14 (a convex portion of the mold), or a material constituting a peripheral edge of the weight reduction space 14 is discharged and formed on only a part of one base material. In the latter case, the weight reduction space 14 is considered to be formed by a mechanical process such as punching or formed by a chemical process such as etching, for example. Both processes may be used together.

In the description herein, the weight reduction space 14 is supplied by an additional process after molding the base material or the sheet material 12. Particularly herein, the weight reduction space 14 is supplied by an additional process after molding the flat first base material 20. More specifically, in the description, the base material side through hole 22 is formed by an additional process of a mechanical process such as punching, for example, after molding the flat first base material 20, and subsequently, the first base material 20 and the second base material 26 are overlapped with each other to form the bottomed hole 16 as the weight reduction space 14. Accordingly, the base material side through hole 22 formed in the first base material 20 is a punching hole.

The base material side through hole 22 is formed in the first base material 20 having larger weight per unit area in the first base material 20 and the second base material 26. For example, the first base material 20 is a solid material having PVC as a material. The second base material 26 is a non-woven cloth having PET or PP as a material.

A thickness of the first base material 20, a thickness of the second base material, and a thickness of the sheet material 12 may be appropriately set. The thickness of the first base material 20 may be the same as the thickness of the second base material 26, or may also be larger or smaller than that. Each of the thickness of the first base material 20, the thickness of the second base material 26, and the thickness of the sheet material 12 may have the same dimension as a diameter of the wire-like transmission member 30, or may also be larger or smaller than that.

The first base material 20 and the second base material 26 are fixed in an overlapped state. The fixing state thereof is not particularly limited, however, the first base material 20 and the second base material 26 are attached to each other directly by a lamination process or indirectly by an adhesive agent and fixed, for example. As a matter of course, the first base material 20 and the second base material 26 may be fixed by an adhesive agent, for example.

It is sufficient that the wire-like transmission member 30 is a wire-like member transmitting electrical power or light. For example, the wire-like transmission member 30 may be a general wire having a core wire and an insulating covering around the core wire, or may also be a bare conductive wire, an enamel wire, a nichrome wire, or an optical fiber. The wire-like transmission member 30 transmitting electrical power and the wire-like transmission member 30 transmitting light may be arranged in parallel or only one of them may be disposed.

The wire-like transmission member 30 transmitting the electrical power may be various kinds of signal lines or various kinds of power lines. The wire-like transmission member 30 transmitting the electrical power may be used as an antenna or coil, for example, transmitting or receiving a signal or electrical power to or from a space.

The wire-like transmission member 30 is considered to include a transmission wire body 32 transmitting electrical power or light and a covering 34 covering the transmission wire body 32. When the wire-like transmission member 30 is a general wire, for example, the transmission wire body 32 corresponds to a core wire, and the covering 34 corresponds to the insulating covering. The core wire includes one or a plurality of strands. Each strand is formed of a conductive material such as copper, copper alloy, aluminum, and aluminum alloy, for example. When the core wire is made up of the plurality of strands, the plurality of strands are preferably stranded. The insulating covering is formed of a resin material such as PVC or PE extrusion-molded around the core wire.

The electrical wire 12 and the wire-like transmission member 30 are fixed to each other. Applicable as the fixing state of the sheet material 12 and the wire-like transmission member 30 are a contact area fixation and a non-contact area fixation, or both fixations may be used together. Herein, the contact area fixation indicates that a portion where the sheet material 12 and the wire-like transmission member 30 have contact with each other is stuck and fixed. The non-contact area fixation indicates the fixing state which is not the contact area fixation. For example, a sewing thread, the other sheet material 12, or an adhesive tape presses the wire-like transmission member 30 toward the sheet material 12, or sandwiches the sheet material 12 and the wire-like transmission member 30 to keep them in the fixing state. In the description hereinafter, the sheet material 12 and the wire-like transmission member 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the sheet material 12 and the wire-like transmission member 30 are indirectly stuck and fixed via an adhesive agent, a gluing agent, and a double-sided adhesive tape provided therebetween. The contact area direct fixation indicates that the sheet material 12 and the wire-like transmission member 30 are directly stuck and fixed without an intervention of the adhesive agent, for example, which is separately provided. Considered in the contact area direct fixation is that resin contained in at least one of the sheet material 12 and the wire-like transmission member 30 is melted, thus the sheet material 12 and the wire-like transmission member 30 are stuck and fixed, for example. In the description hereinafter, the sheet material 12 and the wire-like transmission member 30 are in the state of the contact area direct fixation.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the sheet material 12 and the wire-like transmission member 30 are in the state of the contact area direct fixation by these means. Specifically, when the state of the contact area direct fixation is formed by the ultrasonic welding, for example, the sheet material 12 and the wire-like transmission member 30 are in the state of the contact area direct fixation by the ultrasonic welding.

In the case of the contact area direct fixation, only one of the resin contained in the sheet material 12 and the resin contained in the covering 34 of the wire-like transmission member 30 may be melted, or both of them may be melted. In the former case, the resin which has been melted is stuck on an outer surface of the resin which has not been melted, and a relatively clear interface may be formed in some cases. In the latter case, there may be a case where both the resins are mixed and a clear interface is not be formed. Particularly, when the covering 34 of the wire-like transmission member 30 and the sheet material 12 contain compatible resin such as the same resin material, for example, there may be a case where both the resins are mixed and a clear interface is not be formed.

With regard to a region where the sheet material 12 and the wire-like transmission member 30 are fixed, the sheet material 12 and the wire-like transmission member 30 may be partially fixed in a portion where they have contact with each other along an extension direction of the wire-like transmission member 30, or may also be continuously fixed in a whole portion where they have contact with each other along the extension direction of the wire-like transmission member 30. When the sheet material 12 and the wire-like transmission member 30 are partially fixed along the extension direction of the wire-like transmission member 30, intervals between adjacent fixation positions and a size of each fixation position, for example, may be appropriately set.

Herein, the wife-like transmission member 30 is disposed on the main surface of the sheet material 12 on a side where the opening of the weight reduction space 14 is located. At this time, the wire-like transmission member 30 is disposed in form of extending across the opening of the weight reduction space 14. More specifically, in the example illustrated in FIG. 1, disposed is a wire-like transmission member 30b extending in the first direction through the weight reduction spaces 14 adjacent to each other along the second direction in addition to the wire-like transmission member 30a extending across the opening of the weight reduction space 14. The sheet material 12 and the wire-like transmission member 30 are fixed to each other by the contact area direct fixation.

At this time, the peripheral edge of the opening of the weight reduction space 14 is fixed to the wire-like transmission member 30 by the contact area direct fixation. A portion where the wire-like transmission member 30 is fixed in the main surface of the sheet material 12 where the wire-like transmission member 30 is fixed is concaved more than a portion around the portion where the wire-like transmission member 30 is fixed. More specifically, in the wire-like transmission member 30a, a portion of the sheet material 12 between the weight reduction spaces 14 adjacent to each other along the first direction D1 is fixed to the wire-like transmission member 30 by the contact area direct fixation. In the wire-like transmission member 30b, a portion of the sheet material 12 between the weight reduction spaces 14 adjacent to each other along the second direction D2 is fixed to the wire-like transmission member 30 by the contact area direct fixation.

Considered, for example, is a case where the resin in the sheet material 12 and the resin in the wire-like transmission member 30 are melted by heat and pressure and the sheet material 12 and the wire-like transmission member 30 are thereby fixed by the contact area direct fixation. Considered as such a case is a case where the sheet material 12 and the wire-like transmission member 30 are fixed by the contact area direct fixation of ultrasonic welding. In this case, as illustrated in FIG. 3, the horn 80 and the anvil 82 of an ultrasonic welding machine sandwich a portion of the peripheral edge of the opening of the weight reduction space 14 in the sheet material 12 and the wire-like transmission member 30, and supply ultrasonic vibration with pressure thereto, thus the configuration of contact area direction fixation by the ultrasonic welding is formed in the peripheral edge of the opening of the weight reduction space 14. At this time, the weight reduction space 14 is formed in the sheet material 12, thus the peripheral edge of the opening thereof tends to crush and extend to a side of the opening when the horn 80 and the anvil 82 apply pressure. When the ultrasonic welding proceeds and the sheet material 12 and the wire-like transmission member 30 are attached to each other in the state where the peripheral edge of the opening crushes and extends, this state tends to be maintained after the attachment. Accordingly, a portion where the wire-like transmission member 30 is fixed in the main surface of the sheet 12 where the wire-like transmission member 30 is fixed is concaved more than a portion around the portion where the wire-like transmission member 30 is fixed.

When the horn 80 and the anvil 82 sandwich the peripheral edge of the opening of the weight reduction space 14, as illustrated in FIG. 3, there may be a case where a portion of the opening of the weight reduction space 14, that is to say, a portion where the sheet material 12 and the wire-like transmission member 30 do not have contact with each other are also sandwiched. In this case, an area of the portion where the sheet material 12 and the wire-like transmission member 30 have contact with each other gets small compared with the area of the horn 80, thus energy according to the ultrasonic welding tends to be concentrated on the portion of the peripheral edge of the opening of the weight reduction space 14 where the sheet material 12 and the wire-like transmission member 30 have contact with each other. As a result, this portion is welded easily.

The weight reduction space 14 is preferably formed smaller than the horn 80 and the anvil 82. Accordingly, a state there the horn 80 and the anvil 82 sandwich only the portion of the sheet material 12 where the weight reduction space 14 is formed hardly occurs. In this case, it is considered that in the wire-like transmission member 30b, the portion of the contact area direct fixation gets larger than the size of the weight reduction space 14.

The size of one weight reduction space 14 and the diameter of the wire-like transmission member 30 are described herein. The size of the weight reduction space 14 and the diameter of the wire-like transmission member are not particularly limited, but the size of the weight reduction space 14 may be the same as the diameter of the wire-like transmission member 30, or may also be larger or smaller than that. In the example illustrated in FIG. 1, the size of the weight reduction space 14 is larger than the diameter of the wire-like transmission member 30. Accordingly, even when the wire-like transmission member 30 is disposed to extend across the weight reduction space 14, the weight reduction space 14 is not completely covered by the wire-like transmission member 30.

In the example illustrated in FIG. 1, the plurality of weight reduction spaces 14 are formed to have the same size, however, there may also be the weight reduction space 14 having a different size. At this time, there may be at least two of the three types of weight reduction spaces 14 which are larger than, equal to, and smaller than the diameter of the wire-like transmission member 30 with one size, respectively.

In the example illustrated in FIG. 1, the plurality of wire-like transmission members 30 having the same diameter are applied, however, there may also be the wire-like transmission member 30 having a different diameter. At this time, there may be at least two of the three types of wire-like transmission members 30 having diameters larger than, equal to, and smaller than the weight reduction space 14 with one size, respectively.

Described next is a ratio of reduction in weight in the sheet material 12 caused by the weight reduction space 14. Herein, the weight reduction space 14 is not formed in the second base material 26, thus a ratio of reduction in weight of the first base material 20 including the weight reduction space 14 caused by the base material side through hole 22.

For example, in the example illustrated in FIG. 1, one hundred circular base material side through holes 22 each having a diameter of 8 are formed in a square first base material 20 with side length 100. In this case, an area of the first base material 20 in a case where the base material side through hole 22 is not formed is 10000, and a total area of the base material side through hole 22 is 5026, thus when the area of the first base material 20 in the case where the base material side through hole is not formed is 100, the total area of the weight reduction space 14 is 50.3.

Herein, the base material side through hole 22 is a through hole passing through the first base material 20 with a uniform size in the thickness direction of the first base material 20, thus when a volume of the first base material 20 where the base material side through hole 22 is not formed is 100, a total volume of the base material side through hole 22 between the both main surfaces of the first base material 20 is 50.3 as is the case in the area ratio described above.

In a case where the first base material 20 is a uniform solid material and flatly formed, when the weight of the first base material 20 in the case where the base material side through hole 22 is not formed is 100, the weight reduced by the formation of the base material side through hole 22 is 50.3 as is the cases in the area ratio described above and the volume ratio described above.

According to the wiring member 10 having the above configuration, the weight of the sheet material 12 can be reduced by the weight reduction space 14 formed in the sheet material 12. Accordingly, the weight of the wiring member 10 kept flat by the sheet material 12 can be reduced.

The wire-like transmission member 30 and the sheet material 12 are fixed to each other by the contact area direct fixation. The wire-like transmission member 30 can be fixed on the sheet material 12 by welding, for example. Portions having the same resin material are considered to be fixed by the contact area direct fixation in fixing the covering 34 of the wire-like transmission member 30 and the sheet material 12 by the contact area direct fixation. Herein, both the covering 34 and the sheet material 12 are made up of materials containing PVC and fixed to each other by the contact area direct fixation. At this time, the weight reduction space 14 is formed in a portion of the sheet material 12 made up of the material containing PVC.

Herein, when an automobile electrical wiring is adopted as the wire-like transmission member 30, PVC which is generally used as the covering 34 of the automobile electrical wiring normally has a larger density than PE which is also generally used as the covering 34 of the automobile electrical wiring. Thus, if the sheet material 12 is formed by a material containing PVC to conform to the covering 34, there is a possibility that the sheet material 12 is too heavy. Even in such a case, the weight reduction space 14 is formed in the portion of the sheet material 12 made up of the material containing PVC, thus the weight of the wiring member 10 can be reduced while the contact area direct fixation of the covering 34 and the sheet material 12 is achieved.

The weight reduction space 14 is the bottomed hole 16, thus reduction in a protection capacity can be suppressed compared with a portion where the weight reduction space 14 is a through hole. The sheet material 12 hardly stretches in a direction in which the main surface extends compared with a sheet material in which the weight reduction space 14 is a through hole.

The sheet material 12 includes the first base material 20 in which the base material side through hole 22 passing through the first base material 20 in the thickness direction is formed and the second base material 26 overlapped with the first base material 20 to cover the base material side through hole 22, thus the bottomed hole 16 is formed. Accordingly, the bottomed hole 16 can be formed relatively easily compared with a case where the bottomed hole 16 is directly formed in the sheet material 12 by an additional process. More specifically, when the bottomed hole 16 is directly formed in the sheet material 12 by an additional process, the bottomed hole 16 is considered to be formed by a counter boring process. However, when the sheet material 12 is thin or soft, it is hard to perform the counter boring process on the sheet material 12. In contrast, even when the first base material 20 is thin or soft, it is easy to form the base material side through hole 22 by a punching process.

A third base material may be overlapped with the first base material 20 on a side opposite to the second base material 26. At this time, the third base material covers the base material side through hole 22 of the first base material 20, thus the bottomed hole having both sides covered, that is to say, the hollow space is formed in the sheet material 12 as the weight reduction space 14.

The base material side through hole 22 is formed in the base material having the large weight per unit area in the plurality of base materials, thus the weight of the base material can be significantly reduced compared with the case where the base material side through hole 22 is formed in the base material having the smaller weight per unit area.

The wire-like transmission member 30 is fixed on the main surface of the sheet material 12 on the side where the opening of the weight reduction space 14 is located by the contact area direct fixation, and the portion where the wire-like transmission member 30 is fixed in the main surface of the sheet material 12 where the wire-like transmission member 30 is fixed is concaved more than the portion around the portion where the wire-like transmission member 30 is fixed, thus the thickness of the wiring member 10 can be reduced.

The peripheral edge of the opening of the weight reduction space 14 is fixed to the ire-like transmission member 30 by the contact area direct fixation. Herein, the contact area with the wire-like transmission member 30 is reduced in the peripheral edge of the opening of the weight reduction space 14, thus energy is easily concentrated on contact part at the welding.

Second Embodiment

Figure 4:
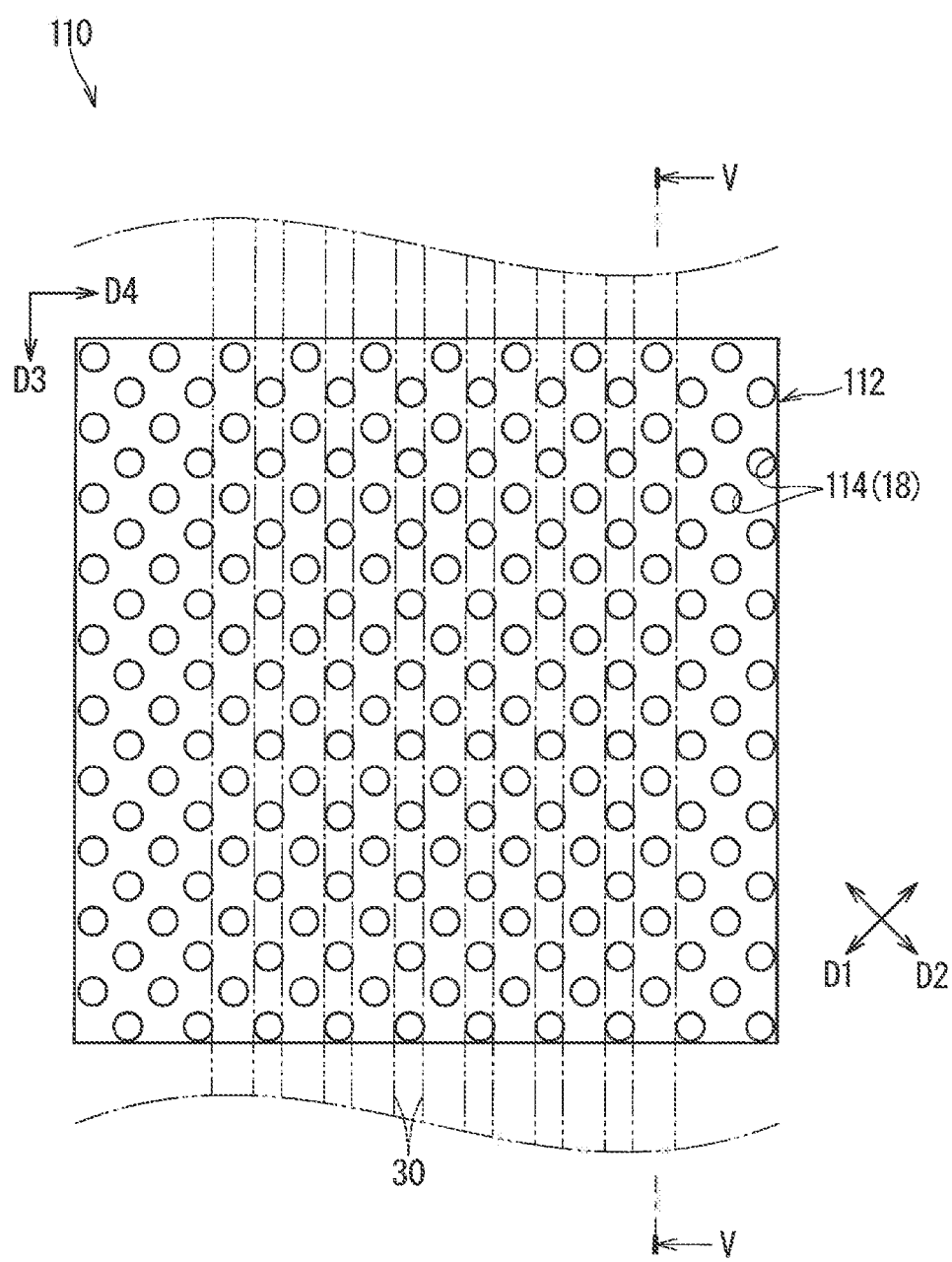
FIG. 4 A plan view illustrating a wiring member according to a second embodiment.
Figure 5:
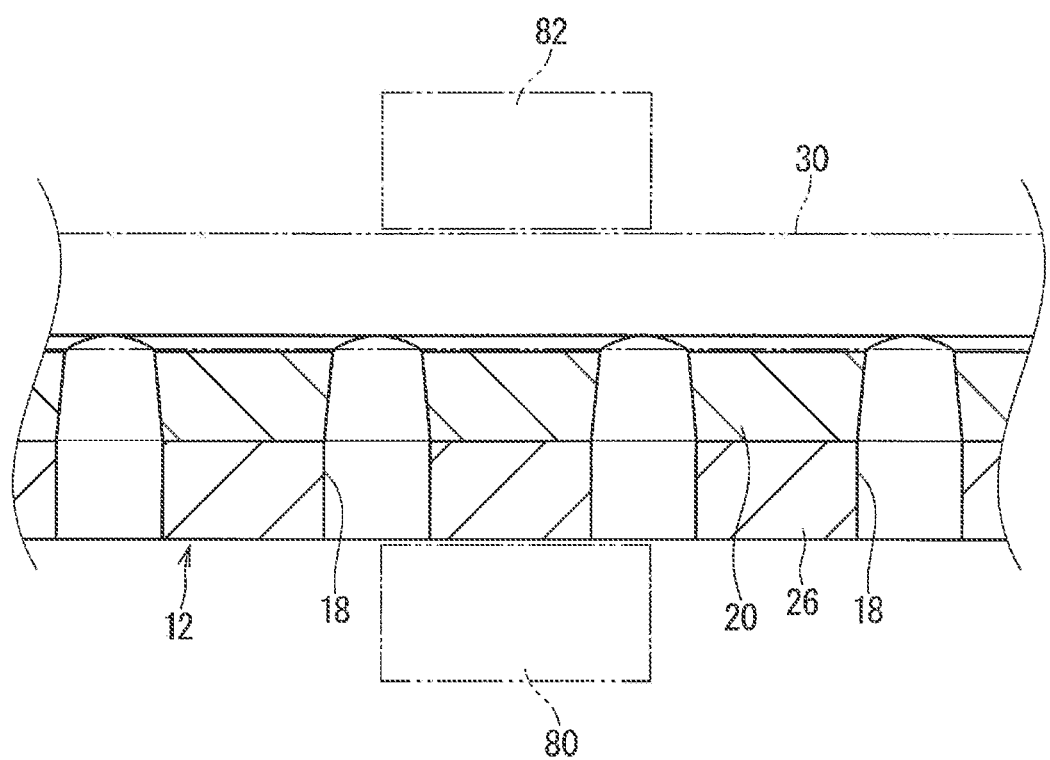
FIG. 5 A cross-sectional view of the wiring member cut along a V-V line in FIG. 4.

A wiring member according to a second embodiment is described. FIG. 4 is a plan view illustrating a wiring member 110 according to the second embodiment. FIG. 5 is a cross-sectional view of the wiring member 110 cut along a V-V line in FIG. 4. In the following description of the present embodiment, the same reference numerals are assigned to the similar constituent elements described above, and the description thereof will be omitted. The same applies to the description of each embodiment hereinafter.

A shape of a sheet material 112 in the wiring member 110 is different from that of the sheet material 12 in the wiring member 10 according to the first embodiment. More specifically, a shape, a size, and an arrangement of a weight reduction space 114 in the sheet material 112 are different from those of the weight reduction space 14 in the sheet material 12.

With regard to the shape of the weight reduction space 114, the weight reduction space 114 is a sheet material, side through hole 18 passing through the sheet material 112. The sheet material side through hole 18 is formed by overlapping the first base material 20 and the second base material 26 which are molds made up of a solid material, and performing a punching process to pass through the overlapped two base materials 20 and 26.

With regard to the size of the weight reduction space 114, the weight reduction space 114 is formed to be equal to or smaller than the diameter (herein, smaller than the diameter) of the wire-like transmission member 30. Accordingly, when the wire-like transmission member 30 is disposed to extend across the weight reduction space 114, the weight reduction space 114 is completely covered by the wire-like transmission member 30.

With regard to the arrangement of the weight reduction space 114, the plurality of weight reduction spaces 114 are disposed in a zigzag manner, That is to say, a direction connecting one weight reduction space 114 and the weight reduction space 114 located closest to the one weight reduction space 114 intersects with a direction in which an edge part of the quadrangular sheet material 112 extends, More specifically, the weight reduction spaces 114 are arranged at regular intervals along the first direction D1 and the second direction D2. The first direction D1 and the second direction D2 are directions mutually perpendicular. The first direction D1 and the second direction D2 are directions intersecting with the vertical direction D3 and the lateral direction D4 of the quadrangular sheet material 12 (in the example illustrated in FIG. 4, a direction intersecting at a 45 degree angle), respectively.

Described next is a ratio of reduction in weight in the sheet material 112 caused by the weight reduction space 114.

More specifically, in a case of the example illustrated in FIG. 4, two hundred circular weight reduction spaces 114 each having a diameter of 4 are formed in a square sheet material 112 with side length 100. In this case, an area of the sheet material 112 in a case where the weight reduction space 114 is not formed is 10000, and a total area of the weight reduction space 114 is 2513, thus when the area of the sheet material in the case where the weight reduction space 114 is not formed is 100, the total area of the weight reduction space 114 is 25.1.

Herein, in a case where the sheet material side through hole 18 is a through hole passing through the sheet material 112 with a uniform size in the thickness direction of the sheet material 112 and the sheet material 112 is flatly formed, when a volume of the sheet material 112 where the sheet material side through hole 18 is not formed is 100, a volume of the sheet material 112 reduced by the formation of the sheet material side through hole 18 is 25.1 as is the case in the area ratio described above.

According to such a wiring member 110, the weight reduction space 114 is the sheet material side through hole 118, thus the weight of the sheet material 112 can be significantly reduced compared with the portion in which the weight reduction space 114 is the bottomed hole 16. More specifically, the amount of reduction in the weight described above also includes the amount of reduction in the second base material 26. In contrast, when the weight reduction space 114 is the bottomed hole 16 described above, the weight is not reduced in the second base material 26, and an effect of reducing the weight of the sheet material 112 is thereby reduced.

Third Embodiment

Figure 6:
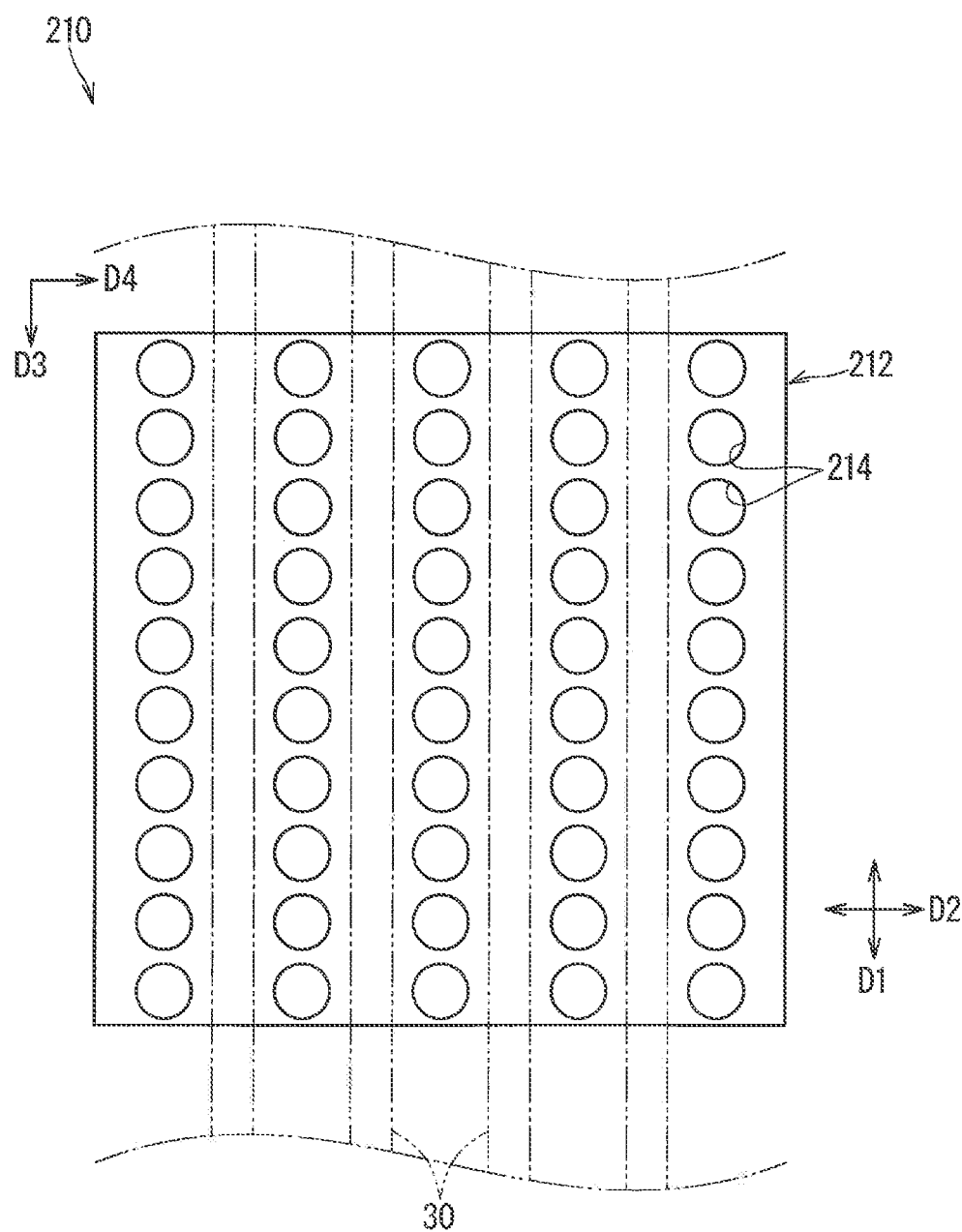
FIG. 6 A plan view illustrating a wiring member according to a third embodiment.

A wiring member according to a third embodiment is described. FIG. 6 is a plan view illustrating a wiring member 210 according to the third embodiment.

A shape of a sheet material 212 and an arrangement of the wire-like transmission member 30 in the wiring member 210 are different from the shape of the sheet material 12 and the shape of the wire-like transmission member 30 in the wiring member 10 described above.

With regard to the shape of the sheet material 212, more specifically, an arrangement of a weight reduction space 214 is different from that of the weight reduction space 14 in the sheet material 12. The weight reduction spaces 214 are arranged along the first direction D1 and the second direction D2 in the sheet material 212. At this time, an interval between the weight reduction spaces 214 adjacent to each other along the second direction D2 is larger than an interval of the weight reduction spaces 214 adjacent to each other along the first direction D1. In the example illustrated in FIG. 6, the interval between the weight reduction spaces 214 adjacent to each other along the second direction D2 is set to be twice the interval of the weight reduction spaces 214 adjacent to each other along the first direction D1, however, this configuration is not necessary. It may be more or less than twice.

Described next is a ratio of reduction in weight in the sheet material 212 caused by the weight reduction space 214. Described particularly herein is a ratio of reduction in weight in the sheet material 20 caused by the base material side through hole 22 on an assumption that the weight reduction space 214 is the bottomed hole 16 formed in the manner similar to the bottomed hole 16 in the first embodiment.

In the case of the example illustrated in FIG. 6, fifty circular weight reduction spaces 214 (base material side through holes 22) each having a diameter of 8 are formed in a square first base material 20 with side length 100. Also in this case, in the manner similar to the case in FIG. 4, an area of the base material in a case where the weight reduction space 214 is not formed is 10000, and a total area of the weight reduction space 214 is 2513, thus when the area of the first base material 20 in the case where the weight reduction space 214 is not formed is 100, the total area of the weight reduction space 214 is 25.1.

In a case where the first base material 20 is a uniform solid material and flatly formed, when the weight of the first base material 20 in the case where the weight reduction space 214 is not formed is 100, the weight reduced by the formation of the weight reduction space 214 is 25.1 as is the case in the area ratio described above.

With regard to the arrangement of the wire-like transmission member 30, the wire-like transmission member 30 is disposed to extend across the weight reduction apace in the above description, however, this configuration is not necessary. As illustrated in FIG. 6, the wire-like transmission member 30 may be disposed away from the weight reduction space 214. Herein, the re-like transmission member 30 is disposed to extend along the first direction D1 between the weight reduction spaces 214 adjacent to each other along the second direction D2 Accordingly, the contact area of the sheet material 212 and the wire-like transmission member 30 can be increased compared with the case where the wire-like transmission member 30 is disposed to extend across the weight reduction space, thus a region on which the contact area direct fixation can be performed can be increased.

As a matter of course, it is also applicable that the wire-like transmission member 30 is disposed on the sheet material 212 illustrated in FIG. 6 to extend along the second direction D2 and the wire-like transmission member 30 extends across the weight reduction space 214. Also in this case, the contact area of the sheet material 212 and the wire-like transmission member 30 can be increased compared with the case where the wire-like transmission member 30 extends on the sheet material 12 according to the first embodiment along the first direction D1 to extend across the weight reduction space 14, thus a region on which the contact area direct fixation can be performed can be increased. It is also applicable that the wire-like transmission member 30 is disposed on the sheet material 212 illustrated in FIG. 6 to extend across the weight reduction space 214 along the first direction D1.

Modification Example

In the above description, the plurality of weight reduction spaces 14, 114, and 214 are formed, however, this configuration is not necessary. One weight reduction space 14, 114, or 214 may be formed. In this case, for example, also applicable is a shape that in the example illustrated in FIG. 1, positions of the weight reduction space 14 and the other portion are reversed in the first base material 20. In this case, a portion remaining as the first base material is located in a form of island on the second base material. A portion between the island portions is defined as the weight reduction space.

In the above description, each of the sheet materials 12, 112, and 212 has the square shape, however, this configuration is not necessary. The sheet materials 12, 112, and 212 may be formed into a shape such as rectangle, parallelogram, or trapezoid, or may also be formed into a curved shape. The sheet materials 12, 112, and 212 may be faulted into a band-like shape elongated in one direction. In this case, it is sufficient that the wire-like transmission member 30 is disposed on the band-like sheet material to extend in a longitudinal direction thereof.

In the above description, the wire-like transmission member 30 are linearly disposed on the sheet materials 12, 112, and 212, however, this configuration is not necessary. The wire-like transmission member 30 may also be curved and disposed on the sheet materials 12, 112, and 212.

In the above description, the plurality of wire-like transmission members 30 are disposed in parallel on the sheet materials 12, 112, and 212, however, this configuration is not necessary. The plurality of wire-like transmission members 30 may also be disposed to extend in mutually different directions on the sheet materials 12, 112, and 212. At this time, the plurality of wire-like transmission members 30 may be disposed so that they are branched, that is to say, a branch part is formed on the sheet material's 12, 112, and 212. The plurality of wire-like transmission members 30 may also be disposed so that they intersect with each other, that is to say, a crossing part is formed on the sheet materials 12, 112, and 212.

Figure 7:
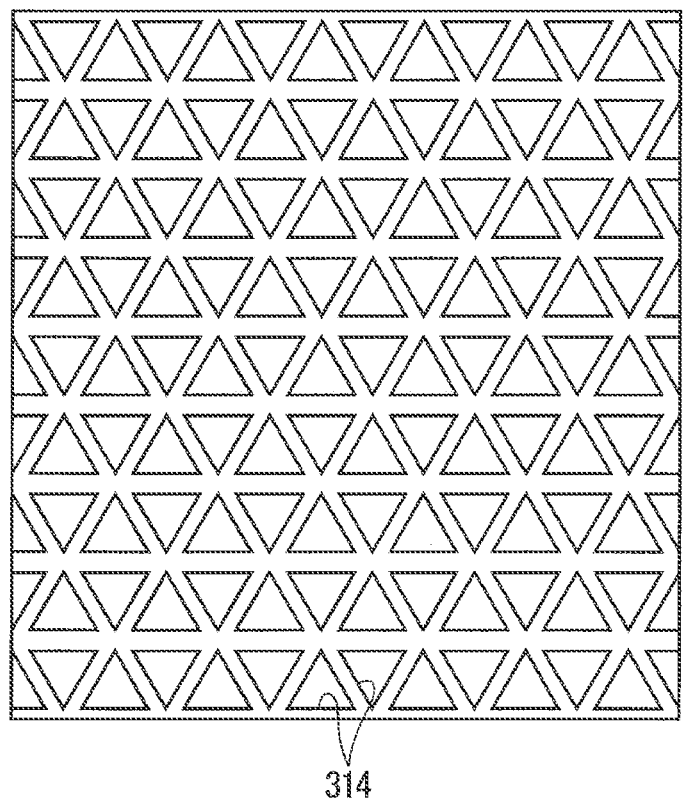
FIG. 7 A plan view illustrating a first modification example of a sheet material.
Figure 8:
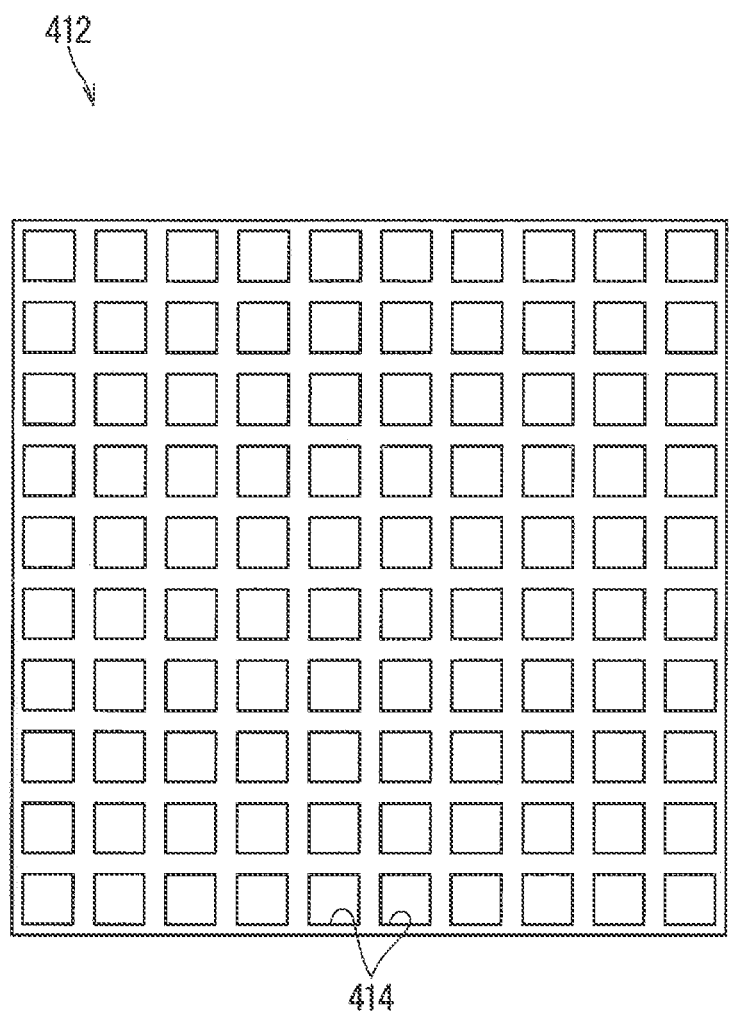
FIG. 8 A plan view illustrating a second modification example of a sheet material.
Figure 9:
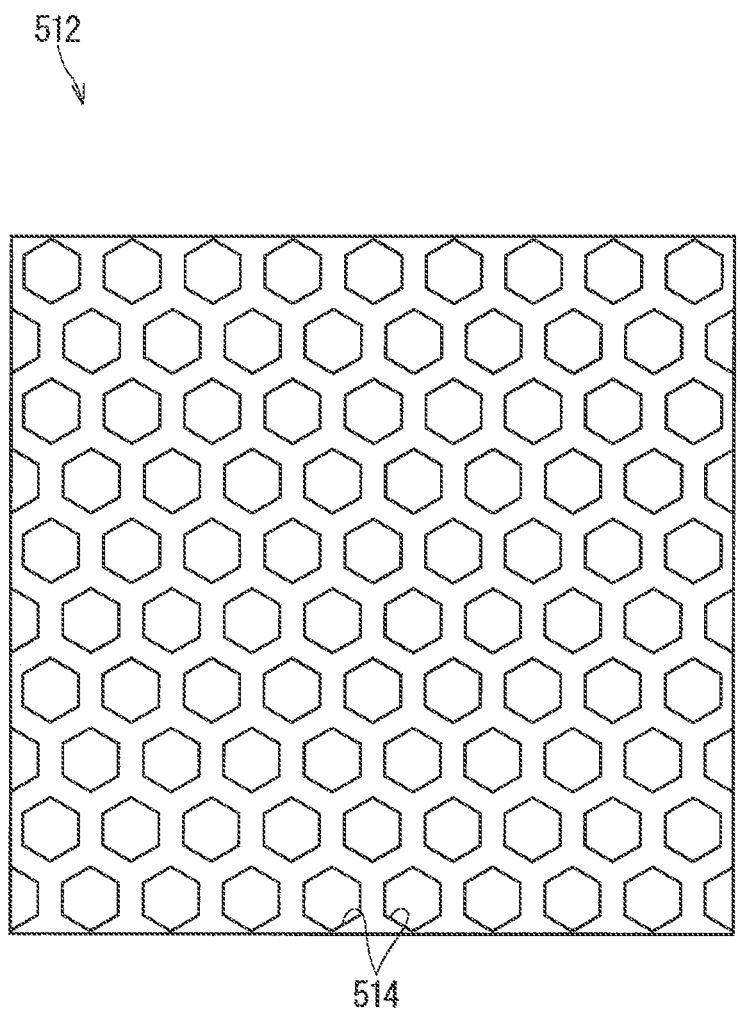
FIG. 9 A plan view illustrating a third modification example of a sheet material.

In the above description, each of the weight reduction spaces 14, 114, and 214 are formed into the circular shape in a plan view, however, this configuration is not necessary. Each of the weight reduction spaces 14, 114, and 214 may be formed into a shape other than the circular shape in a plan view. Each of the weight reduction spaces 14, 114, and 214 may have a polygonal shape such as triangle, quadrangle, pentagon, and hexagon, for example. In a sheet material 312 according to a first modification example illustrated in FIG. 7, a weight reduction space 314 is formed into a triangle shape in a plan view. In a sheet material 412 according to a second modification example illustrated in FIG. 8, a weight reduction space 414 is formed into a quadrangular shape in a plan view. In a sheet material 512 according to a third modification example illustrated in FIG. 9, a weight reduction space 514 is formed into a hexagonal shape in a plan view.

The configurations described in the embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from e scope of the invention.

EXPLANATION OF REFERENCE SIGNS 10, 110, 210 wiring member
12, 112, 212, 312, 412, 512 sheet material
14, 114, 214, 314, 414, 514 weight reduction space
16 bottomed hole
18, 118 sheet material side through hole
20 first base material
22 base material side through hole
26 second base material
30, 30a, 30b wire-like transmission member
32 transmission wire body
34 covering
80 horn
82 anvil
D1 first direction.
D2 second direction
D3 vertical direction
D4 lateral direction

The invention claimed is:

1. A wiring member, comprising:
a sheet material in which a weight reduction space is formed; and
a wire-like transmission member fixed on the sheet material, wherein
the weight reduction space includes a bottomed hole or a sheet material side through hole passing through the sheet material in a thickness direction,
the wire-like transmission member is disposed to extend across an opening of the bottomed hole or the sheet material side through hole of the weight reduction space, and
the sheet material is flat in whole.

2. The wiring member according to claim 1, wherein
the weight reduction space includes at least the bottomed hole, and
the wire-like transmission member is disposed to extend across the opening of the bottomed hole.

3. The wiring member according to claim 1, wherein
the weight reduction space includes at least the sheet material side through hole passing through the sheet material in the thickness direction, and
the wire-like transmission member is disposed to extend across the opening of the sheet material side through hole.

4. The wiring member according to claim 1, wherein
the wire-like transmission member and the sheet material are fixed by a contact area direct fixation.

5. The wiring member according to claim 4, wherein
the wire-like transmission member is fixed on a main surface of the sheet material on a side with the opening of the bottomed hole or the sheet material side through hole of the weight reduction space by a contact area direct fixation, and
a portion where the wire-like transmission member is fixed in the main surface of the sheet material where the wire-like transmission member is fixed is concaved more than a portion around the portion where the wire-like transmission member is fixed.

6. The wiring member according to claim 4, wherein
the wire-like transmission member includes a transmission wire body and a covering for covering the transmission wire body,
both the covering and the sheet material are formed by a material containing polyvinyl chloride and fixed by a contact area direct fixation, and
the weight reduction space is formed in a portion of the sheet material formed by the material containing polyvinyl chloride.

7. A wiring member, comprising:
a sheet material in which a weight reduction space is formed; and
a wire-like transmission member fixed to the sheet material, wherein
the weight reduction space includes a bottomed hole, and
the sheet material includes a first base material in which a base material side through hole passing through the first base material in a thickness direction is formed and a second base material overlapped with the first base material to cover the base material side through hole, and the base material side through hole which is partially covered by the second base material forms the bottomed hole.

8. The wiring member according to claim 7, wherein
in the first base material and the second base material, a weight per unit area of the first base material is larger than that of the second base material.

9. A wiring member, comprising:
a sheet material in which a weight reduction space is formed; and
a wire-like transmission member fixed to the sheet material, wherein
the wire-like transmission member and the sheet material are fixed by a contact area direct fixation,
the wire-like transmission member is fixed to a main surface of the sheet material on a side with an opening of the weight reduction space by a contact area direct fixation,
a portion where the wire-like transmission member is fixed in the main surface of the sheet material where the wire-like transmission member is fixed is concaved more than a portion around the portion where the wire-like transmission member is fixed,
the wire-like transmission member is disposed to extend across the opening of the weight reduction space, and
a peripheral edge of the opening of the weight reduction space is fixed to the wire-like transmission member by a contact area direct fixation.

* * * * *